Aug. 19, 1941.        L. A. QUINDRY         2,253,048
                       FISHING LINE
                    Filed Aug. 5, 1939
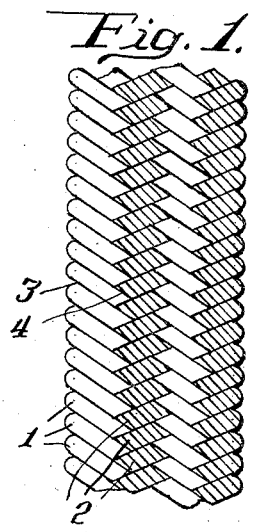
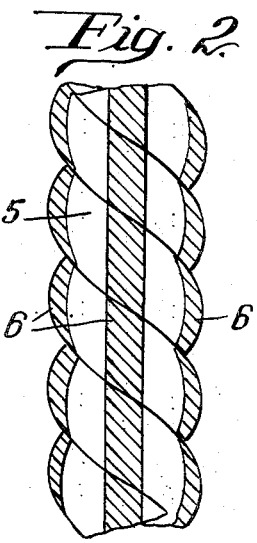
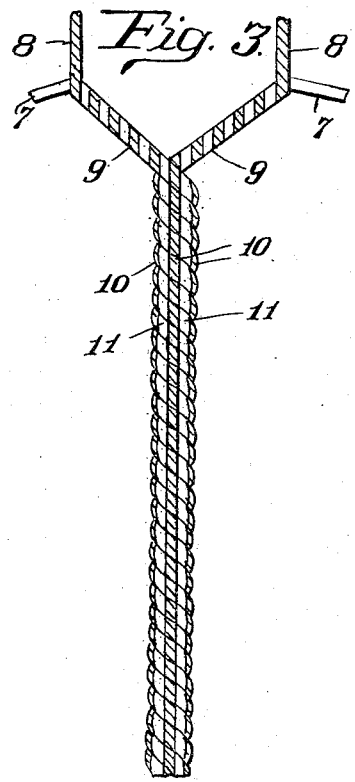
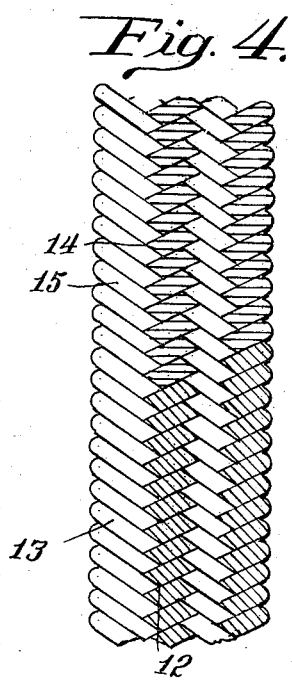
Inventor
Leland A. Quindry Patented Aug. 19, 1941

2,253,048

UNITED STATES PATENT OFFICE 2,253,048

FISHING LINE

Leland A. Quindry, Chicago, Ill.

Application August 5, 1939, Serial No. 288,556

4 Claims. (Cl. 57—139)

This invention is directed to new and useful improvements in fishing line whereby when in water the line will be less visible and thus increase the chances of the fisherman in securing a good haul of fish.

It should be understood that this invention is directed to any securing member between the hook or line and the pole, whether it be the entire fish line, a portion thereof, or a leader and when used herein "fish line" shall have that broad meaning.

Furthermore, a fishing line within the contemplation of this invention may be made of any material, such as linen, silk, cotton, metal or any synthetic material, the type of material used having no bearing upon the invention.

Fishing lines embodying this invention have a plurality of colors so arranged that when the line is in use it will blend in with the natural colors of the water and vegetation so as to be difficult to be seen. This coloring is arranged in stripes running longitudinally of the line so that although the line may be drawn through the water, as in casting or trolling, the motion will not be apparent.

The primary object of the invention is to provide a camouflaged fishing line having a plurality of longitudinally extending stripes of contrasting colors.

Another object is to provide such a line formed of material of contrasting colors whereby the finished appearance will be a longitudinally striped line.

Still a further object of this invention is to provide a novel fish line having longitudinally extending stripes of contrasting colors, a portion of said line from one end thereof having longitudinal stripes of certain contrasting colors, the other end thereof having similar stripes but of different colors thus providing a reversible fishing line one end portion to be used under certain conditions and the other under different conditions.

Other objects and advantages will become apparent from the following detailed description.

It is known that different bodies of water have their different and peculiar appearances, due to mineral contents, vegetation therein and nearby, sun, wind and sky, and various other conditions and it is also known that a given body of water will change in appearance, depending upon the time of day or year, flood, drought and other such conditions. Thus the background for the fishing line changes and must be met to satisfactorily camouflage the line. Furthermore, the line has two different backgrounds, depending upon the angle at which viewed; if viewed from below the background is the water as affected by the sky; if from above or the side the background is the water as affected by the bottom and sides of the lake. Thus two colors are essential.

It is necessary, therefore, to provide fishing lines having different color combinations of longitudinal stripes to fit the different conditions of the water fished and to disguise the line so that its motion through the water will not be noticed. Thus for example lines may be formed having such contrasting stripes of the following color combinations:

Yellow and white; amber and white; amber and yellow; green and white; green and yellow; blue and white; blue and yellow; blue and green. The fisherman must learn to analyze the water that he fishes and then use the line having the best color combination for naturally blending with the water.

To give the fisherman two combinations which he may use according to the conditions under which he is fishing, a line is formed half of one color combination and half of another combination. Thus he may have, for example, a color combination on one end which will be desirable for fishing green water on a bright day and on the other end a combination adapted for use in blue water on a cloudy day.

The formation of the lines with stripes running their length is very important in causing them to be less visible in the water. When drawn through the water the longitudinal stripe gives no appearance of motion. Fishing lines heretofore made utilize fabrics of the same or contrasting colors twisted or woven in spiral or barber-pole fashion thus producing stripes which are diagonal to or nearly perpendicular to the length of the line. It is apparent that such diagonal or cross lines passing a given spot as the line is moved through the water draw attention to the line in contrast to the camouflaging effect of the longitudinal stripes.

In the drawing:

Fig. 1 is an enlarged side elevation view of a portion of a line embodying this invention showing the braiding necessary to form the lengthwise lines.

Fig. 2 is an enlarged side elevation view of a portion of another form of line also embodying this invention.

Fig. 3 is a perspective view showing in detail the formation of the line shown in Fig. 2.

Fig. 4 is a side elevation of a portion of line showing the formation of one color combination on one end and a different color combination on the other.

The line shown in Fig. 1 is formed on a standard round braiding machine in which the material of one color 1 is wound on bobbins placed on carriers operating in a clockwise direction and the material of the other color 2 is wound on bobbins placed on carriers operating in a counter-clockwise direction. In such a standard braid, each strand of the material passes alternatively over and under two of the opposite strands. Thus, as is shown, a plurality of longitudinal stripes 3 and 4 of contrasting color are obtained, the drawing showing stripes 3 as white and stripes 4 as green. As enlarged the edges of the stripes are not smooth but in actual size the general appearance will be satisfactory.

In Fig. 2 the line is formed by twisting together two similar strands or lines, each formed of two contrasting materials so spaced that when the two similar lines are twisted together the contrasting materials line up to form longitudinal stripes on the finished line. In the enlarged view the stripes on the edges of the line are wavy due to the round contour of the smaller lines but in actual size the effect will be satisfactory. Here for example the longitudinal stripes 5 are white and 6 are green.

Fig. 3 clearly shows the formation of the line of Fig. 2. The two contrasting colored materials 7 and 8 are twisted together to form spirally colored lines 9. The two lines 9 are then twisted together so that the green portions 8 become aligned, thus forming a finished line of green and white stripes 10 and 11 respectively.

Fig. 4 shows the middle portion of a reversible fishing line having one color combination on one end and another on the other end, as heretofore described. As shown, one portion is formed with longitudinal green and white stripes 12 and 13, respectively, and the other portion with blue and white stripes 14 and 15, respectively.

The formation of fishing lines embodying this invention as herein shown is illustrative only and the invention is in no way limited to any method of formation. Likewise the invention is not limited to such fishing lines formed of any stated kind of materials. The invention is directed to fishing lines having colored stripes extending lengthwise of the line so as to camouflage the motion of the line when drawn through the water and to blend the line in with the water so as to minimize its visibility.

I claim:

1. A twisted fishing line formed of spirally striped strands whereby the striped portions of the strands align themselves to present a finished line having longitudinally extending stripes.

2. A fishing line formed of materials different in appearance but selected from the colors of the water in which the line is to be used whereby the portions of the materials visible after completion of the line form in appearance contrasting stripes extending lengthwise of the line of such colors as will camouflage the line against longitudinal motion when used in such water.

3. A braided fishing line formed of strands of material of two different colors selected according to the water in which the line is to be used so as to blend in with the natural colors thereof whereby the portions of the strands visible after the line has been braided form in appearance stripes of alternating colors extending lengthwise of the line which colors when in the water fished will blend in with the colors thereof to make the line less visible when moved longitudinally through the water.

4. A fishing line formed with longitudinal stripes of contrasting colors selected with regard to the natural colors of the water in which the line is to be used for fishing so that the combination of the longitudinal stripes and said selected colors will effectively cause the line to be camouflaged so as to be less visible in the water and apparently motionless when moved longitudinally therethrough.

LELAND A. QUINDRY.